United States Patent [19]

Barkley

[11] Patent Number: 4,503,008

[45] Date of Patent: Mar. 5, 1985

[54] PROCESS FOR PRODUCING SELF-TEXTURING FABRIC WITH SOFT HAND

[75] Inventor: Billy L. Barkley, Decatur, Ala.

[73] Assignee: Celanese Corporation, New York, N.Y.

[21] Appl. No.: 383,038

[22] Filed: May 28, 1982

[51] Int. Cl.³ .............................................. B29C 25/00
[52] U.S. Cl. ................................ 264/342 R; 8/130.1;
    264/282; 264/346; 264/DIG. 71
[58] Field of Search ............ 264/282, 342 R, 342 RE,
    264/DIG. 71, 346; 8/130.1

[56] References Cited

U.S. PATENT DOCUMENTS

| | | | |
|---|---|---|---|
| 2,758,908 | 8/1956 | Kolb | 264/342 R |
| 2,952,879 | 4/1960 | Kitson et al. | 264/230 |
| 3,030,173 | 4/1962 | Kurzke et al. | 264/342 RE |
| 3,416,881 | 12/1968 | Nordmann | 8/130.1 |
| 3,427,376 | 2/1969 | Dempsey | 264/282 |
| 3,530,214 | 9/1970 | Hermes | 264/342 |
| 3,562,382 | 2/1971 | Fowler | 264/342 RE |
| 3,655,327 | 4/1972 | Rollins | 8/130.1 |
| 4,051,215 | 9/1977 | Tsuruta et al. | 264/282 |
| 4,332,757 | 6/1982 | Blackmon et al. | 264/167 |

Primary Examiner—Philip Anderson
Attorney, Agent, or Firm—S. M. Bodenheimer, Jr.

[57] ABSTRACT

A greige fabric containing a polyester yarn having high and low shrinkage regions along the filaments, out of phase from filament to filament, is bulked by shrinking the unrestrained fabric, then heating the fabric sufficiently to make the fabric elongate in the direction of the polyester yarn.

9 Claims, 4 Drawing Figures

PROCESS FOR PRODUCING SELF-TEXTURING FABRIC WITH SOFT HAND

The invention relates to the art of producing fabrics with soft hands. More particularly, the invention relates to a process for producing such fabrics in which the greige fabric incorporates a critically selected type of continuous filament polyester yarn.

Fabrics made from flat (untextured) continuous filament polyester yarns have a slick hand which is undesirable for many end uses. It is therefore customary to use false-twist textured polyester yarns in order to improve the hand and covering power of the resulting fabrics. Such textured yarns have been commercially used in fabrics on a vast scale for many years. However, the cost of the texturing step is substantial, and the resulting fabrics, while greatly superior to those produced from flat yarns, do not provide the desirable soft hand obtained by use of yarns spun from staple fibers such as cotton.

According to the invention, these and other difficulties in the prior art processes are avoided by treating a critically selected greige fabric by specific process steps as disclosed in detail below. Generally stated, the specific greige fabric is shrunk, optionally tentered a small amount, and heated sufficiently to cause the polyester yarn to grow in length.

ASPECTS

According to the first major aspect of the invention there is provided a process for producing a fabric having a soft hand from a greige fabric comprising a yarn extending in a given direction along a given dimension of the fabric, the yarn having a shrinkage between about 5% and 25% and comprising a plurality of polyester continuous filaments having regions of high and low shrinkage along the lengths of the filaments, the regions of high and low shrinkage being out of phase from filament to filament, the filaments having average deniers less than 6 and within-filament shrinkage CV's of at least 10%, the process comprising shrinking the greige fabric to provide a shrunken fabric having a shrunken dimension in the direction, and heat-setting the shrunken fabric at a temperature sufficiently high and for a time sufficiently long to cause the shrunken fabric to grow at least 3% in the direction as compared to the shrunken dimension. According to a further aspect, the regions of high and low shrinkage are substantially regularly recurring along the length of each of the filaments. According to a further aspect, the filaments have average deniers less than 3. According to a further aspect, the filaments have within-filament shrinkage CV's of at least 20%. According to a further aspect, the yarn has a shrinkage between 7 and 17%. According to a further aspect, after the step of shrinkage and prior to the step of heat-setting, the fabric is stretched in the direction an amount no greater than 60% of the amount by which the fabric shrank. According to a further aspect, after the step of shrinkage and prior to the step of heat-setting, the fabric is stretched an amount no greater than 15% of the amount by which the fabric shrank. According to a further aspect, the yarn has a crimp-to-shrinkage ratio of at least 0.25. According to a further aspect, the yarn has a crimp-to-shrinkage ratio of at least 0.40.

Other more specific aspects all in part appear hereinafter and will in part be apparent from the following detailed description taken in connection with the accompanying drawing, in which.

Detailed Description of Preferred Yarn Usable in the Invention

Figure 1:
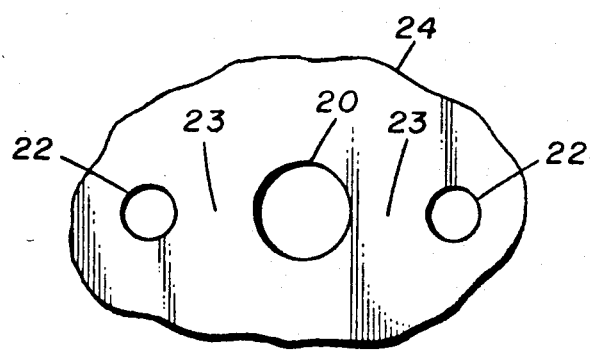
FIG. 1 is a bottom plan view of a spinneret combined orifice used for producing the preferred yarn for use in the invention.

In the preferred embodiment of the spinneret, illustrated in FIG. 1, capillary 20 has a diameter of 0.305 mm., while satellite capillaries 22 have diameters of 0.203 mm. The centers of capillaries 22 are located such that the widths of lands 23 (the lateral spacing between capillaries) is about 0.084 mm. All capillaries are 1.016 mm. in length.

Figure 2:
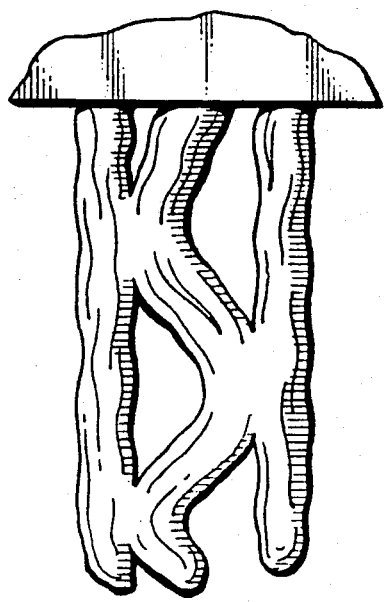
FIG. 2 is a schematic side view of the molten streams just below the face of the spinneret.

Capillary 20 and its associated satellite capillaries 22 cooperate as a combined orifice for spinning a single filament, as schematically shown in FIG. 2. Ordinarily, a plurality of combined orifices will be provided in a single spinneret so that the resulting multifilament yarn comprises more than one of the filaments according to the invention. Advantageously, all orifices of a spinneret will be combined orifices so that the multifilament yarn will be composed solely of filaments according to the invention.

One of the sub-streams has a higher velocity than at least one other of the sub-streams which unite to form a combined stream. Advantageously, the faster sub-stream will have a velocity of from 2 to 7 times the velocity of the slower stream or streams. FIG. 2 illustrates qualitatively the resulting action of the molten sub-streams immediately below the spinneret specifically described above. Since all the capillaries in this instance are the same length, the larger sub-stream issuing from capillary 20 has a higher velocity upon extrusion than the sub-streams issuing from capillaries 22. The center sub-stream accordingly alternately strikes and bonds to one or the other of the outer sub-streams. The combined stream thus formed is attenuated and the various sub-streams unite side-by-side to form a single stream having thick and thin regions along its length. This stream is quenched as it is accelerated to the spinning speed, i.e., the speed at which the filament travels immediately after solidification. The resulting filament has properties uniquely determined by spinning speed.

The spun yarns preferably have a crimp-to-shrinkage ratio of greater than about 0.25, preferably greater than about 0.40.

The regularly spaced thick and thin regions of the filament coincide with shrinkage peaks and valleys in the filament. Thus, the thick regions are substantially amorphous even though the filament is spun at high speeds. When the filament is exposed to thermal treatment while relaxed, the amorphous thick regions shrink more than do the thin regions.

The differential shrinkage causes crimping or bulk development in the yarn since the shrinkage peaks and valleys are out of phase from filament to filament. Upon thermal treatment of the yarn, high shrinkage portions of filaments adjacent low shrinkage portions of other filaments cause such low shrinkage portions of adjacent filaments to buckle, causing bulking of the yarn.

Yarns suitable for use in the invention may be spun using a spinneret as above disclosed with reference to FIG. 1, by conventionally melt-spinning and quenching the resulting combined molten streams into filaments, provided that the spinning speed is selected such that the resulting yarn has a shrinkage between about 5% and 25% (preferably between 7% and 17%), and an elongation between 40 and 140%. The appropriate spinning speed for producing the required shrinkage level will vary somewhat, depending on combined orifice dimensions and the polymer metering rate, and will generally be found between about 3500 and 5000 yards per minute. If the yarn shrinkage is above 25%, the spinning speed should be increased. Conversely, if the yarn shrinkage is below about 5%, the spinning speed, should be reduced. In order to produce a soft hand, the filaments must have deniers below 6 and preferably below 3.

EXAMPLE I

This exemplifies preparation of a yarn suitable for incorporating into a fabric for use in the present process. Polyester polymer of normal molecular weight for apparel yarns is spun through a spinneret having 68 combined orifices as disclosed above at a melt temperature of 293° C. The combined streams are conventionally quenched by transversely directed air into filaments at a spinning speed of 5000 yards per minute and the filaments wound on a package as a multifilament yarn.

Figure 3:
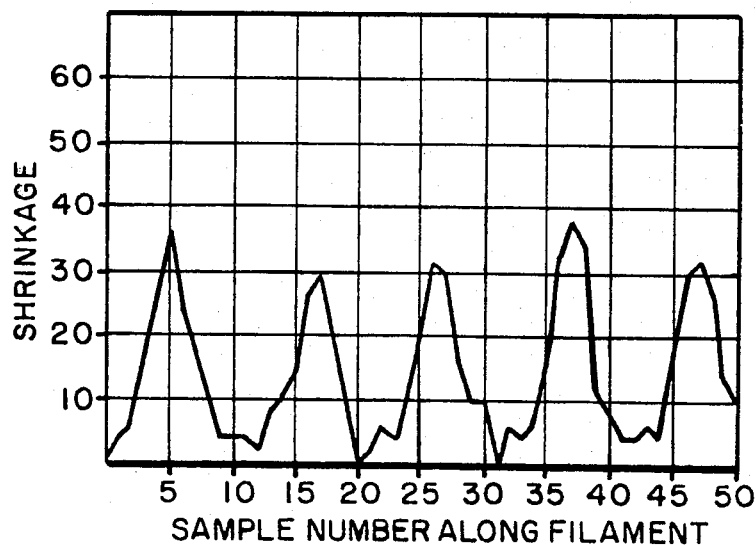
FIGS. 3 and 4 are graphs of shrinkage profiles of filaments made with the FIG. 1 spinneret.
Figure 4:
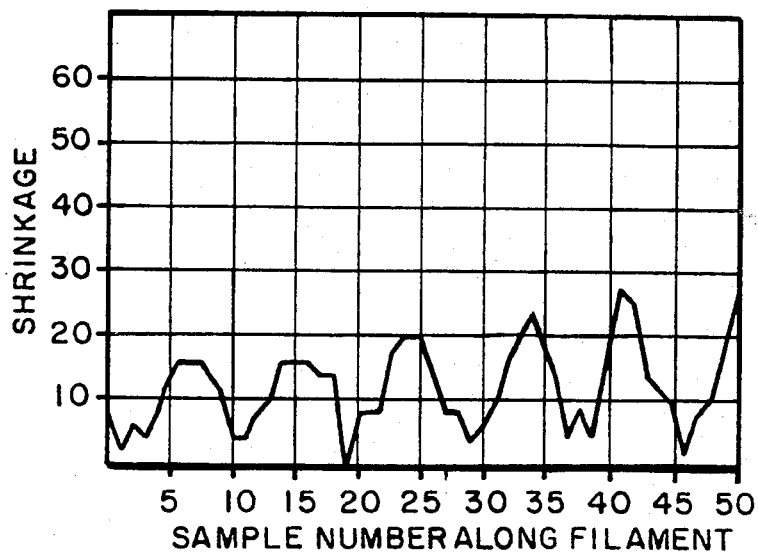

The polymer throughout is adjusted to provide an average of 3.2 denier per filament in the resulting yarn. The yarn has a shrinkage of 9.7% and a crimp of 4.4% to give a crimp-to-shrinkage ratio of 0.45. FIGS. 3 and 4 are shrinkage profiles of two filaments from such a yarn, and illustrate the substantial regularity of occurrence of the shrinkage peaks and valleys. These figures also illustrate that the shrinkage peaks and valleys are out of phase from filament to filament, and indeed have somewhat different repetition rates. The within-filament and between-filament shrinkage CV's are well above 10%.

EXAMPLE II

This is an example of the process of the invention. The yarn of Example I is woven as filling across a standard commercial polyester-cotton warp of 36/1 C.C. to provide a greige width of about 46 inches. A first portion of the resulting greige fabric is scoured at the boil for 30 minutes while permitting it to freely shrink, then dyed at the boil while similarly unrestrained, resulting in a shrunken width (the dimension in the filling direction) of about 37 inches. A first portion of the dyed fabric is tentered (stretched in the filling direction) at room temperature to a stretched width of about 40 inches, then passed through an oven for 30 seconds at 350° F. During the latter heating step, the fabric spontaneously increases in width (the filling direction) by several percent, due to crystallization of the filling yarn.

The resulting finished fabric has an unusually luxuriant, soft hand, and is assigned a subjective hand rating of 5 on a scale of 1 to 5 by a skilled fabric technologist experienced in evaluating fabric hand properties. On this scale, a rating of 1 represents the very poor, slick hand of a fabric wherein the filling yarn is untextured, and a fabric wherein the filling yarn is a conventional false-twist textured yarn would have a rating of about 3.

A second portion of the dyed fabric of this example is tentered by an amount of ¾ the amount by which the fabric has previously shrunk, then heat-set at 350° F. for 30 seconds. The hand of this fabric is noticeably inferior to that of the fabric in the preceeding paragraph above, being judged to have a subjective hand rating of only about 3–3.5. This illustrates that the shrunken fabric should not be stretched prior to final heating step by an amount more than 60% of the amount by which it shrinks during scouring and dyeing. That is, if the fabric shrinks 6 inches, it should be stretched no more than 3.6 inches prior to heat-setting. With some combinations of yarns according to the invention and fabric constructions, no tentering prior to heat-setting gives the softest hand, but with others a small amount of tentering (about 1/10 of the amount by which the fabric shrank) gives the softest hand.

A third portion of the dyed (shrunken) fabric of this example is made into a shirt without having been heat-set. The shirt is unsatisfactory due to instability of the fabric. This demonstrates the necessity of heating the shrunken fabric at a temperature sufficiently high and for a time sufficiently long to cause the fabric to grow in the filling direction to a larger width than the shrunken width.

EXAMPLE III

Example I is repeated, except that the spinning speed is reduced until the yarn has a shrinkage of 30%, the polymer metering rate being also reduced to produce 165 denier yarn. The yarn is woven as filling across the same polyester-cotton warp as in Example II, and the greige fabric thus produced is scoured, dyed and heat-set as in Example II. The resulting fabric has a harsh, "boardy" hand, whether or not the fabric is tentered prior to heat-setting, and regardless of the amount of tentering attempted. This example illustrates that yarns having shrinkage above about 25% do not result in the desired soft hand.

EXAMPLE IV

Example I is repeated, except that the spinning speed and polymer metering rates are increased to provide a yarn having about 3½% shrinkage and 165 denier. The yarn is woven as filling across the same warp as in Example II, and the greige fabric thus produced is scoured, dyed and heat-set as in Example II. The resulting finished fabric has a slick, undesirable hand, whether or not the fabric is tentered prior to heat-setting, and regardless of the amount of tentering attempted. This Example illustrates that yarns having shrinkages below about 5% do not result in the desired soft hand.

DEFINITIONS

Shrinkage profile of filaments (and 5 cm. shrinkages) are determined by separating a 2.5 meter yarn sample bundle into separate filaments. Care must be taken not to stretch the filaments. Each filament is then cut into consecutive serially numbered 5 cm. segments. These are placed while unrestrained in boiling water for 30 seconds. The length of each segment is then measured, and its shrinkage as a percentage of the original 5 cm. length is calculated. For example, if a segment has a length of 4.2 cm. after the treatment with boiling water, its shrinkage would be 16%. The percentage shrinkages, when plotted in serial number order, provides a profile of shrinkage variation along each filament, as illustrated in FIGS. 3 and 4.

The term "C.V." means coefficient of variation, a standard statistical term defined, for example, in "Statistical Theory with Engineering Applications" by Hald, published by John Wiley and Sons in 1952. The 5 cm. shrinkage percentages both along each filament and between filaments are calculated and expressed as percent C.V.'s.

Yarn properties are determined differently. The yarn is conditioned for at least one hour in an atmosphere of 22° C. and 65% relative humidity. If the yarn is wound on a package, at least 100 meters are stripped off and discarded. The yarn is wound under a tension of 0.035 grams per denier on a Suter denier reel or equivalent device having a circumference of 1.125 meters to a total skein denier of approximately (but not to exceed) 8000, and the ends are tied. For example, for a 170 denier yarn, 24 revolutions would give a skein denier of 8160. In this instance, 23 revolutions would be used. The skein is removed from the denier reel and suspended from a 1.27 cm. diameter round bar. A 1000 gram weight is gently hung on the bottom of the skein with a bent #1 paper clip or equivalent piece of wire weighing less than 1 gram. After 30 seconds, the skein length is measured to the nearest 0.1 cm. The measured length is recorded as Lo. The 1000 gm. weight is then replaced with a 20 gm. weight, and the rod with the suspended skein and 20 gm. weight are placed in an oven at 120° C. for 5 minutes and then removed. The suspended skein is then conditioned for 1 minute at 22° C. and 65% relative humidity. The skein length L1 is measured to the nearest 0.1 cm. The 20 gm. weight is then carefully replaced by the 1000 gm. weight. Thirty seconds after the 1000 gm. weight has been applied, the skein length L2 is measured to the nearest 0.1 cm. The percentage crimp is than calcuated as $$L2 - L1 \times 100/L2$$

while the percentage yarn shrinkage is calculated as
$$Lo - L2 \times 100/Lo$$

Filaments in a skein can be so entangled that replacing the 20 gm. weight by the 1000 gm. weight will not cause a change in skein length even though the skein obviously has not had its crimp pulled out. In such a case, the 1000 gm. may be gently jarred until the weight falls and removes the crimp. To characterize a yarn, 100 samples are tested by the procedures in this paragraph. The highest 10 and lowest 10 values are discarded. The other values are averaged to provide crimp and shrinkage values for the yarn.

What is claimed is:

1. A process for producing a fabric having a soft hand from a greige fabric comprising a yarn extending in a given direction along a given dimension of said fabric, said yarn having a shrinkage between about 5% and 25% and comprising a plurality of polyester continuous filaments having regions of high and low shrinkage along the lengths of said filaments, said regions of high and low shrinkage being out of phase from filament to filament, said filaments having average deniers less than 6 and within-filament shrinkage CV's of at least 10%, said process comprising:
   a. shrinking said greige fabric to provide a shrunken fabric having a shrunken dimension in said direction; and
   b. heat-setting said shrunken fabric at a temperature sufficiently high and for a time sufficiently long to cause said shrunken fabric to grow at least 3% in said direction as compared to said shrunken dimension.

2. The process defined in claim 1 wherein said regions of high and low shrinkage are substantially regularly recurring along the length of each of said filaments.

3. The process defined in either claim 1 or 2, wherein said filaments have average deniers less than 3.

4. The process defined in either claim 1 or 2, wherein said filaments have within-filament shrinkage CV's of at least 20%.

5. The process defined in either claim 1 or 2, wherein said yarn has a shrinkage between 7 and 17%.

6. The process defined in either claim 1 or 2, further comprising after said step of shrinkage and prior to said step of heat-setting:
   a. stretching said fabric in said direction an amount no greater than 60% of the amount by which said fabric shrank.

7. The process defined in either claim 1 or 2, further comprising after said step of shrinkage and prior to said step of heat-setting:
   a. stretching said fabric in said direction an amount no greater than 15% of the amount by which said fabric shrank.

8. The process defined in either claim 1 or 2, wherein said yarn has a crimp-to-shrinkage ratio of at least 0.25.

9. The process defined in either claim 1 or 2, wherein said yarn has a crimp-to-shrinkage ratio of at least 0.40.

* * * * *